United States Patent
Goumri-Said et al.

(10) Patent No.: US 11,932,552 B2
(45) Date of Patent: *Mar. 19, 2024

(54) METHOD AND PROCESS TO MAKE CHITOSAN-DOPED STRONTIUM OXIDE NANOCOMPOSITE FOR WATER PURIFICATION

(71) Applicant: Alfaisal University, Riyadh (SA)

(72) Inventors: Souraya Goumri-Said, Riyadh (SA); Mohammed Benali Kanoun, Riyadh (SA); Salamat Ali, Lahore (PK); Junaid Haider, Tianjin (CN); Ali Haider, Lahore (PK); Muhammad Ikram, Lahore (PK)

(73) Assignee: Alfaisal University, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/551,655

(22) Filed: Dec. 15, 2021

(65) Prior Publication Data
US 2023/0183087 A1  Jun. 15, 2023

(51) Int. Cl.
*C01F 11/24* (2006.01)
*C02F 1/58* (2023.01)
(Continued)

(52) U.S. Cl.
CPC ............. *C01F 11/24* (2013.01); *C02F 1/58* (2013.01); *C02F 1/705* (2013.01); *C08L 5/08* (2013.01);
(Continued)

(58) Field of Classification Search
CPC .. C01F 11/24; C02F 1/58; C02F 1/705; C02F 2101/308; C02F 2103/30; C02F 2305/08; B82Y 30/00; B82Y 40/00; C01P 2004/64
(Continued)

(56) References Cited

PUBLICATIONS

Ikram et al. 2 Journal of Nanostructure in Chemistry vol. pp. 933-950 available on Line Oct. 12, 2021 (Year: 2021).*
(Continued)

*Primary Examiner* — Claire A Norris
(74) *Attorney, Agent, or Firm* — Geeta Kadambi; RIDDHI IP LLC

(57) ABSTRACT

Strontium oxide (SrO) nanoparticle and various concentrations of chitosan (CS)-doped SrO nanocomposite were synthesized via co-precipitation method. A variety of characterization techniques including were done for characterizing and qualifying the nanocomposite. X ray powder diffraction affirmed cubic and tetragonal structure of SrO nanoparticle and CS-doped SrO nanocomposite with a decrease in crystallinity upon doping. Fourier transform infrared spectrum endorsed existing functional groups on CS/SrO surfaces while d-spacing was estimated using high resolution Transmission electron microscopes images. UV-Visible and Photoluminescence spectroscopy spectra showed an increase in band gap energies with an increase in doping concentration. Elemental composition of CS-doped SrO nanocomposite deposited with different doping concentrations was studied using Energy dispersive Spectroscopy. Addition of chitosan resulted in the formation of nanocomposite and rod-like structures that led to enhanced catalytic activity during methylene blue ciprofloxacin degradation in the presence of reducing agent sodium borohydrate at various pH conditions.

16 Claims, 12 Drawing Sheets

(51) Int. Cl.
*C02F 1/70* (2023.01)
*C08L 5/08* (2006.01)
*B82Y 30/00* (2011.01)
*B82Y 40/00* (2011.01)
*C02F 101/30* (2006.01)
*C02F 103/30* (2006.01)

(52) U.S. Cl.
CPC ............... *B82Y 30/00* (2013.01); *B82Y 40/00* (2013.01); *C01P 2004/64* (2013.01); *C02F 2101/308* (2013.01); *C02F 2103/30* (2013.01)

(58) Field of Classification Search
USPC ....................................................... 210/757
See application file for complete search history.

(56) References Cited

PUBLICATIONS

Tomke et al. International Journal of Biological Macromolecule 149, pp. 989-999, 2020. (Year: 2020).*

* cited by examiner

METHOD AND PROCESS TO MAKE CHITOSAN-DOPED STRONTIUM OXIDE NANOCOMPOSITE FOR WATER PURIFICATION

FILED OF TECHNOLOGY

A method and process to make and use chitosan-doped strontium oxide nanocomposite for water purification is described.

BACKGROUND

Water is an irreplaceable resource that drives our lives. Discharge of organic pollutants into industrial wastewater has become a global environmental problem. Worldwide, every year textile industries inject ~280,000 tons of dyes into water as industrial effluents. Water pollution is a problem that affects aquatic ecosystems and living organisms. Nowadays, contamination due to dye effluents is fast becoming a serious concern and has prompted rapid increase in the use of technologies suitable for wastewater treatment. Textile industries wastage composed of unconsumed dyes and its constituents create serious difficulties in wastewater treatment plants. The presence of high color, total dissolved solids and heavy metals decrease the capacity of pollutants to self-degrade in wastewater. For dye removal, more conventional methods are used including chemical oxidation, coagulation, adsorption and biological processes; yet, these do not remove dye effectively. Dye decolorization is not suitable for biological process since most dyes are toxic while insoluble dyes are removed with coagulation technique. Moreover, due to their toxic decomposition products, most dyes (particularly reactive dyes) exacerbate environment problem even after treatment. Due to their structure and recalcitrant nature, degradation of dyes is tricky. For a conventional chemical reaction, electrochemical reactions and photo-reactions have used metal-oxide nanoparticles as catalysts since several decades. Initially, main attention was focused on the synthesis of transition metal-oxide nanoparticles (MONPs) such as strontium oxide (SrO) due to their structural flexibility and potential applications. Hierarchical morphology of SrO nanoparticles (NPs) helps in the design of solar cells, electrodes for lithium ion batteries, super capacitors and gas sensor devices. Lately, metal NPs assimilated into polymers has been proposed where immobilizing metal NPs on polymers matrix (nanometal polymer hybrids) efficiently prevents NPs aggregation. In addition, metal NPs biocompatibility also are improved. Growth and stabilization of metal NPs are controlled with the help of polymer matrix. Polymers such as chitosan (CS) and gelatin are used as reduction/stabilizing agents for the synthesis of SrO NPs. There is a need to find a cost effective and efficient system to remove the dye rather than dissipate the color and let the chemical remain in the water.

SUMMARY

The instant declaration describes a method and process of making Strontium oxide (SrO) nanoparticle. In another embodiment adding SrO nanoparticle with chitosan and making a chitosan (CS)-doped SrO nanocomposite by co-precipitation method is described. In one embodiment, the chitosan (CS)-doped SrO nanocomposite is used for reducing chemical dye from the polluted water. In one embodiment, CS-doped SrO nanocomposite with various concentration of CS (0, 2, 4 and 6 wt %) is added to act as a catalyst to remove water soluble dyes from polluted water. In one embodiment, a method of making a CS-doped SrO nanocomposite to render sufficient catalytic efficiency for the dye degradation of commonly used MBCF dye in textile industries is disclosed. In one embodiment, formation of nanoparticles and rod-like structures of chitosan (CS)-doped SrO nanocomposite showed enhanced catalytic activity during Methylene Blue Ciprofloxacin (MBCF) degradation in the presence of reducing agent $NaBH_4$.

In one embodiment a process of making SrO nanoparticle from Strontium (Sr) precursor is described. In one embodiment, strontium chloride hexahydrate is used as a chemical precursor to make SrO nanoparticle in powder form. In one embodiment, a process strontium chloride hexahydrate is dissolved in distilled water and magnetically stirred for 2 hours. In another embodiment, adjusting a pH of the dissolved solution of strontium chloride hexahydrate to a specific pH such as pH 12 is done and by adding sodium hydroxide solution for 2 hours to form a precipitate of a strontium chloride hexahydrate nanoparticle in solution is described.

Strontium chloride hexahydrate nanoparticle in solution is then centrifuged to collect a pellet of the precipitate of the strontium chloride hexahydrate nanoparticle. Subsequently the pellet of the strontium chloride hexahydrate nanoparticle is heated at 120° C. for 24 hours to obtain a powder of strontium chloride hexahydrate nanoparticle; preparing a strontium chloride hexahydrate nanoparticle solution using the powder of strontium chloride hexahydrate nanoparticle in distilled water with various concentrations of a chitosan the specific pH using a specific basic solution to create a CS-doped SrO nanocomposite; and the resultant product is used for reducing a pollutant content in water by adding the CS-doped SrO nanocomposite in presence of a reducing agent at a second specific pH to purify water.

In one embodiment, a process of making a CS-doped SrO nanocomposite by mixing water and a strontium chloride hexahydrate and stirring the mixer for 2 hours to make a solution of the strontium chloride hexahydrate and in order to form a precipitate of a strontium chloride hexahydrate nanoparticle in solution by adjusting a pH of the solution of strontium chloride hexahydrate to a specific pH at 12 by adding sodium hydroxide solution for 2 hours and stirring is performed. Once the pellet is formed, in one embodiment, collecting a pellet strontium chloride hexahydrate nanoparticle by centrifuging the a strontium chloride hexahydrate nanoparticle in solution and making a powder of strontium chloride hexahydrate nanoparticle by heating the pellet of the strontium chloride hexahydrate nanoparticle at 120° C. for 24 hours and grinding the heated pellet is done.

In one embodiment a process of preparing a strontium chloride hexahydrate nanoparticle solution using the powder of strontium chloride hexahydrate nanoparticle in distilled water with various concentrations of a chitosan the specific pH using a specific basic solution to create a CS-doped SrO nanocomposite is done.

In another embodiment, purification process of contaminated industrial water by reducing the pollutant content in water by adding the CS-doped SrO nanocomposite in presence of a reducing agent at a second specific pH is performed. Various concentrations of CS, different pH conditions etc., were tested for efficacy to reduce pollutants in water.

Other features will be apparent from the accompanying drawings and from the detailed description that follows.

BRIEF DESCRIPTION OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

In the instant disclosure a method and process of making a CS-doped SrO nanocomposite is described. The instant invention the CS-doped SrO nanocomposite is characterized by measuring structural properties and phase compositions. In another embodiment, a method to degrade an industrial pollutant using the CS-doped SrO nanocomposite is described. In one embodiment, a process to make and use the CS-doped SrO nanocomposite is described and water is purified of industrial pollutant.

Materials: Strontium chloride hexahydrate ($SrCl_2 \cdot 6H_2O$, 99%) and sodium hydroxide (NaOH, 98%) were obtained from Sigma-Aldrich while acetic acid ($CH_3COOH$) was purchased from PANREAC QUIMICA SA. Commercially available chitosan (CS) was purchased from Ali Baba Company, China. MBCF, $NaBH_4$ and NaOH were purchased from Sigma Aldrich (Germany).

Figure 1:
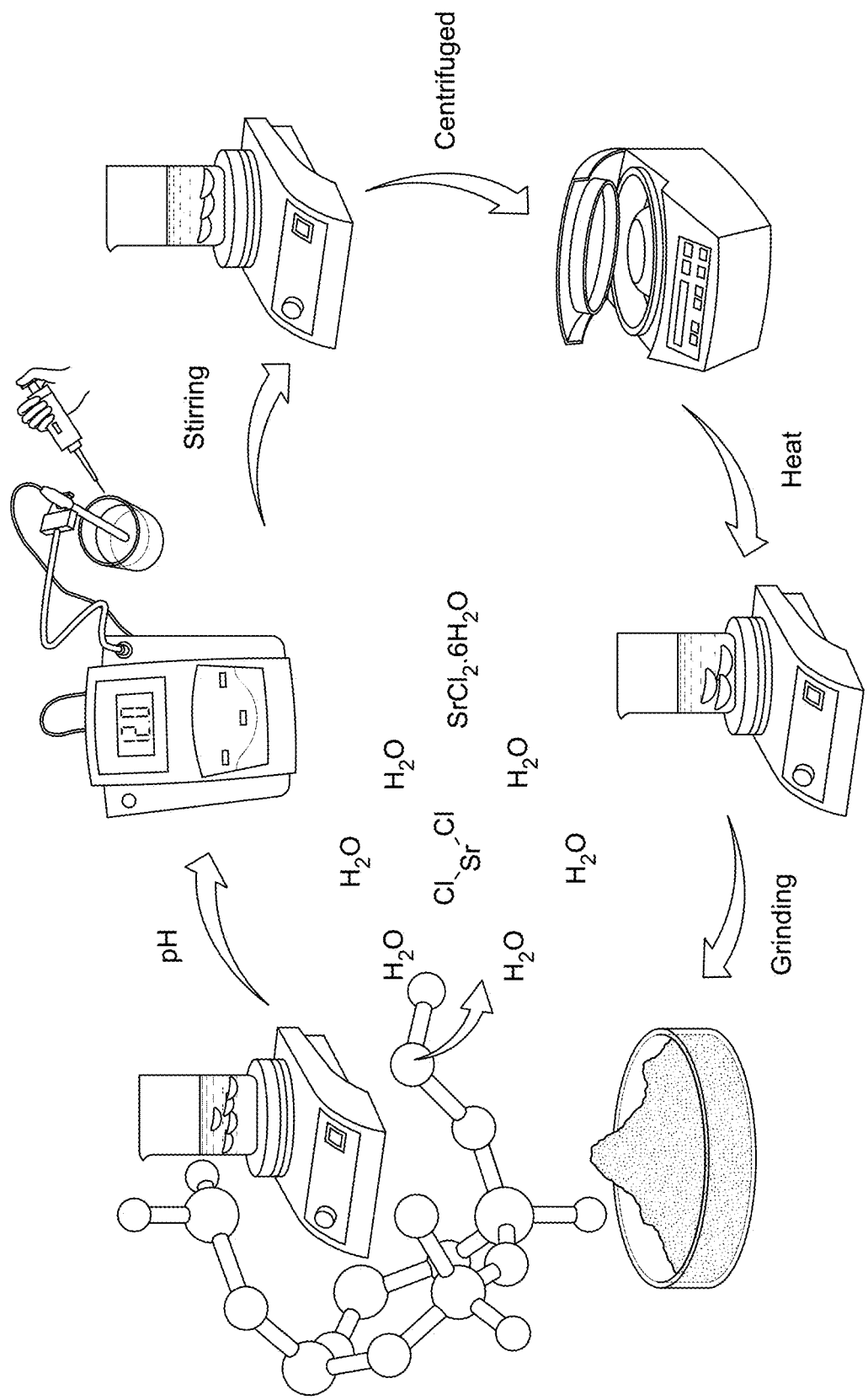
FIG. 1 shows schematic diagram of method of making the CS-doped SrO nanocomposite.

A method and process to synthesize SrO nanoparticle: For SrO nanoparticle synthesis, chemical precursor strontium chloride hexahydrate (0.5 M in 50 ml distilled water) was magnetically stirred for 2 hours. Prepared solution was centrifuged and the supernatant was removed. The collected pellet was washed several times with distilled water to remove the impurities. After centrifugation the supernatant was discarded and the washed precipitate for used for further processing. Subsequently, the washed precipitate was heated at 120° C. for 24 hours to obtain a dry white powder and the powder is grinded to obtain SrO nanoparticle (see FIG. 1)

A method and process to make CS-doped SrO nanocomposite: CS-doped SrO nanocomposite were synthesized by adding various amounts of CS (2, 4, and 6 wt %) in the SrO nanoparticle (0.5 M in 50 ml distilled water) solution. Sodium hydroxide solution (NaOH (0.5M) was added to the mixed solution to maintain the pH at12. The NaOH added mixed solution at pH 12 was vigorously stirred at 70° C. for 30 minutes. Finally, the resultant CS doped mixture was centrifuged at 4000 rpm for 10 minutes and collected pellet was dried at 120° C. to obtain chitosan (CS)-doped SrO nanocomposite (CS—SrO nanocomposite).

Figure 2:
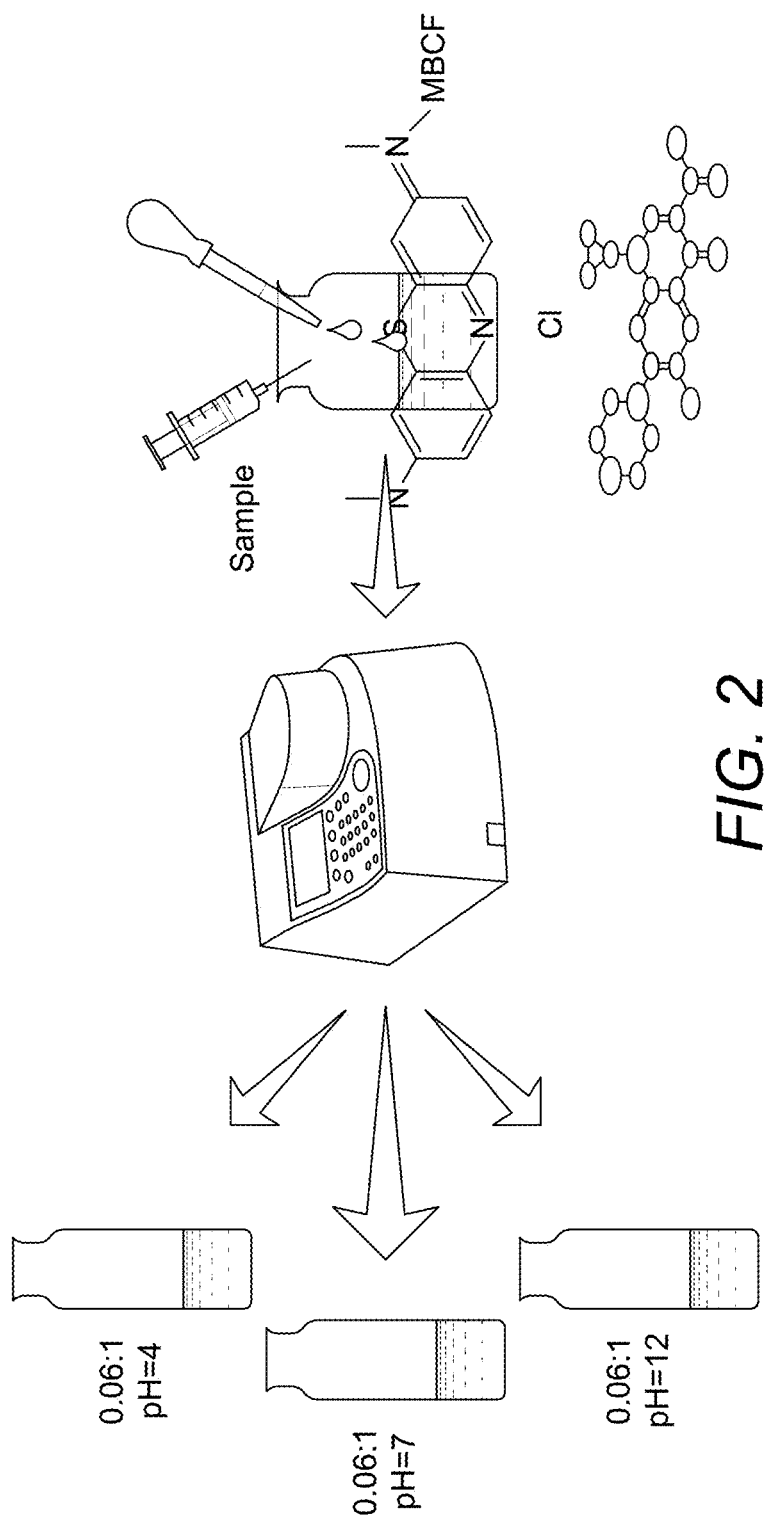
FIG. 2 shows schematic diagram of CS-doped SrO nanocomposite as catalyst for removing industrial pollutant.

Catalysis: Catalytic ability of prepared CS—SrO nanocomposite was investigated by mixing diluted solution of CS—SrO nanocomposite (400 µL) in 3 ml of MBCF solution in the presence of freshly prepared reducing agent $NaBH_4$ (600 µL) (see FIG. 2). Blue colour of dye disappeared gradually indicating degradation of MBCF in to Leuco-MBCF. Results of collected samples at different intervals were monitored with UV-vis spectrophotometer during catalysis whereas degradation was calculated using following Eq 1.

$$\% \text{ Degradation} = \frac{C_0 - C_t}{C_0} \times 100 \quad \text{(Equation 1)}$$

where $C_0$ and $C_t$ are initial and final concentrations of MBCF.

Characterization of Synthesized CS—SrO Nanocomposite: PAN analytical x-ray diffraction (XRD) equipment with Cu Kα-radiation (λ=0.15 nm) was used to analyse phase composition of prepared CS—SrO nanocomposite within the range of 10°-80°. The presence of bonds in CS—SrO nanocomposite was investigated through FTIR using Perkin Elmer spectrometer. UV-Vis spectrophotometer (Genesys 10S spectrophotometer) was used for optical properties of CS—SrO nanocomposite while PL emission spectra were obtained with JASCO FP-8200 spectrofluorometer FP-8200 spectrofluorometer. EDS (INCA EDS software) was used to estimate the elemental composition while the morphology and microstructure of CS—SrO nanocomposite was examined with the help of high resolution transmission electron microscope HRTEM (model JEOL JEM 2100F).

Figure 3A:
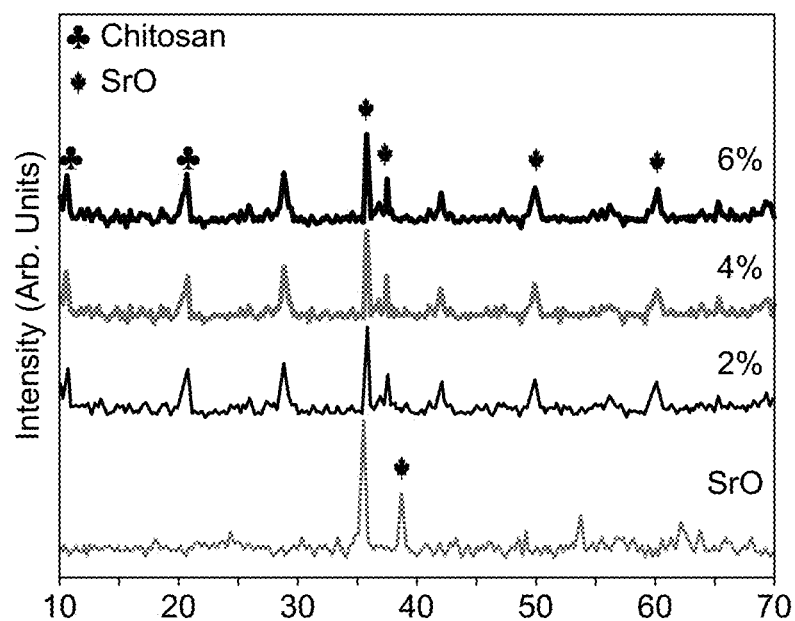
FIG. 3A shows X ray powder diffraction (XRD) pattern of CS-doped SrO NCs, FIG. 3B Fourier transform infrared (FTIR) spectra, FIG. 3C, FIG. 3D, FIG. 3E.
Figure 3B:
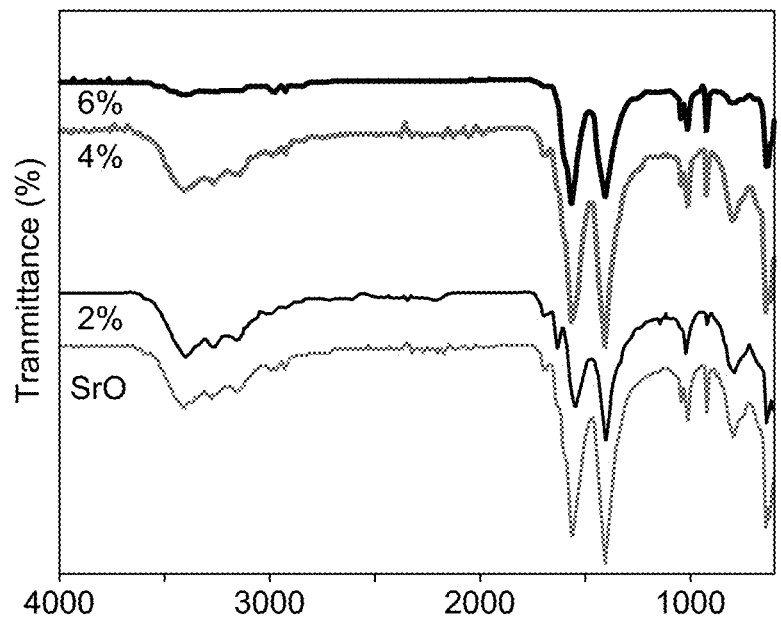
FIG. 3F shows selected area electron diffraction (SAFE)) pattern of CS-doped SrO nanocomposite (0, 2, 4 and 6 wt %).
Figure 3F:
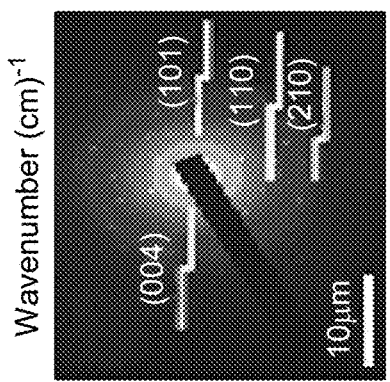
Figure 3E:
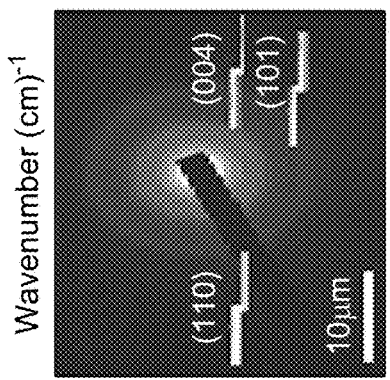
Figure 3D:
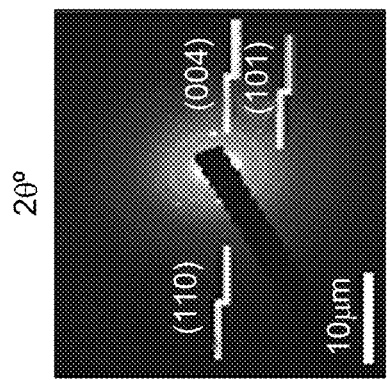
Figure 3C:
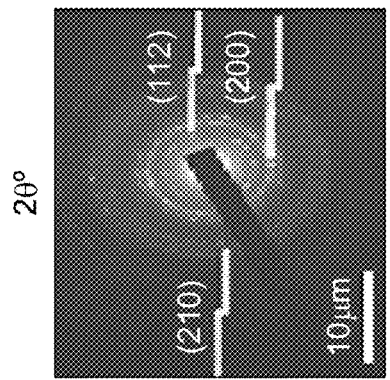

Structural properties and phase composition of SrO and CS—SrO nanocomposite were analysed using XRD technique (FIG. 3A). Observed peaks of reference sample (SrO) found at 35°, 38.6° and 49° assigned to (110), (112) and (210) planes, respectively matched with JCPDS#6-520, 75-0263. Diffraction peaks of CS—SrO nanocomposite demonstrated at 10.1°(001), 20.63°(020), 28.8°(101), 37.4° (101), 42.07°(004), 49.7°(220) and 60.4°(110) are designated using JCPDS file (No: 001-1113, 48-1477 and 01-073-0661) confirming cubic and tetragonal structure of SrO. Average crystallite sizes of samples estimated from Debye—Scherer equation were calculated to be 44.7, 29.18, 29.2 and 29.1 nm for SrO nanoparticle and CS-doped SrO nanocomposite (2, 4 and 6 wt %), respectively (FIG. 3B). Decrease in crystallite size was observed upon varying dopant concentration in SrO. SAED patterns of samples as illustrated in FIG. 3C, FIG. 3D and FIG. 3F. Observed ring features confirm cubic and tetragonal SrO structure, product is crystallized providing evidence that is consistent with XRD results.

Figure 4A:
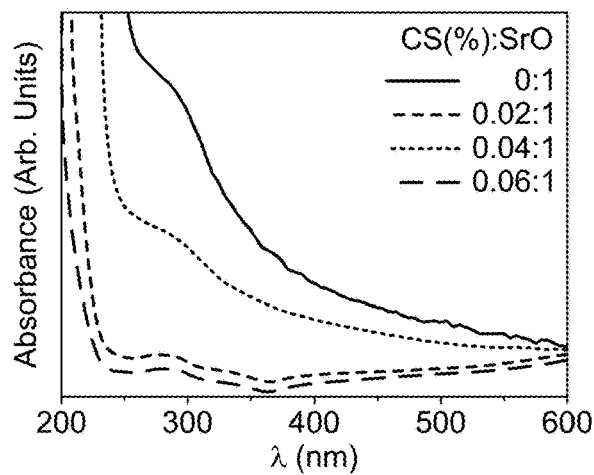
FIG. 4A shows UV vis. Spectra.
Figure 4B:
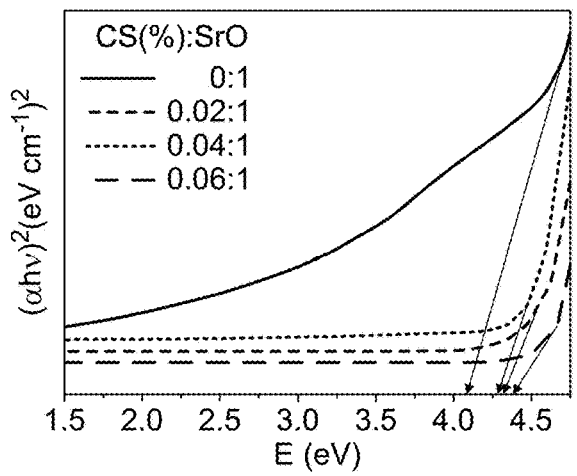
FIG. 4B shows Tauc plot for band gap and FIG. 4C shows PL spectra from various ratios of CS-doped SrO nanocomposite.

FTIR technique was recorded in the region of 4000-500 $cm^{-1}$ to illuminate functional groups present in the samples (SrO and CS-doped SrO nanocomposite). Observed band at 605 $cm^{-1}$ recognized the formation of metal-oxide (Sr—O) bond that confirmed configuration of SrO NCs. Realistic peak at 810.10 $cm^{-1}$ is attributed to Sr—O bending vibrations. Band observed at 1011 $cm^{-1}$ was assigned to Sr—O bond (asymmetric and symmetric vibration frequencies). Absorption band at 1433.11 $cm^{-1}$ can be ascribed to C—O stretching vibrations and O—H bending (14). FTIR spectra of SrO manifested peaks at 3282 $cm^{-1}$ and 1552 $cm^{-1}$ revealed the presence of O—H and —C=C— (stretching), respectively. Broad band at 3422 $cm^{-1}$ indicated the presence of O—H vibrations of water molecules as shown in FIG. 3b. According to UV-Visible principle, outer electrons absorbed radiant energy and make transitions to high energy levels. UV-Vis spectra of samples were recorded in the range (200~600 nm) whereas broad absorption band at 296.8 nm was found for the host sample (FIG. 4A). This absorption is attributed to quantum size effect of monodispersed colloidal particles. Upon doping, blueshift was observed from 296.8 to 280 nm attributed to the effect of quantum confinement. This blueshift led to an increase in $E_g$ of SrO (4.19 eV) to 6% doped SrO (4.3 eV)(FIG. 4B).

Figure 4C:
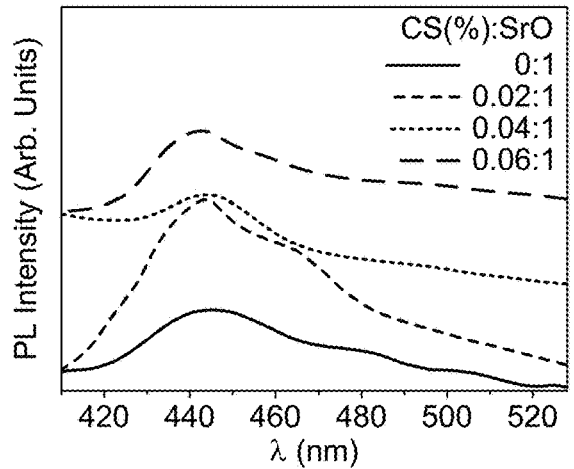

Photoluminescence (PL) spectroscopy was employed to determine migration, transfer, separation and recombination of charge carriers in SrO and CS-doped SrO (FIG. 4C). Results in fast ($e^-$-$h^+$) pairs recombination rate of higher and lower PL intensity may be due to slow (delayed) recombination. PL spectrum indicated peak of SrO at 300 nm with broad emission band in the range of 450-480 nm (blue region) due to excitation recombination and luminescence. CS-doped SrO nanocomposite samples exhibit intense and broad emission band at around 440 nm (violet region) while decrease in PL intensity was observed for increased doping amount in SrO lattice.

Figure 5A:
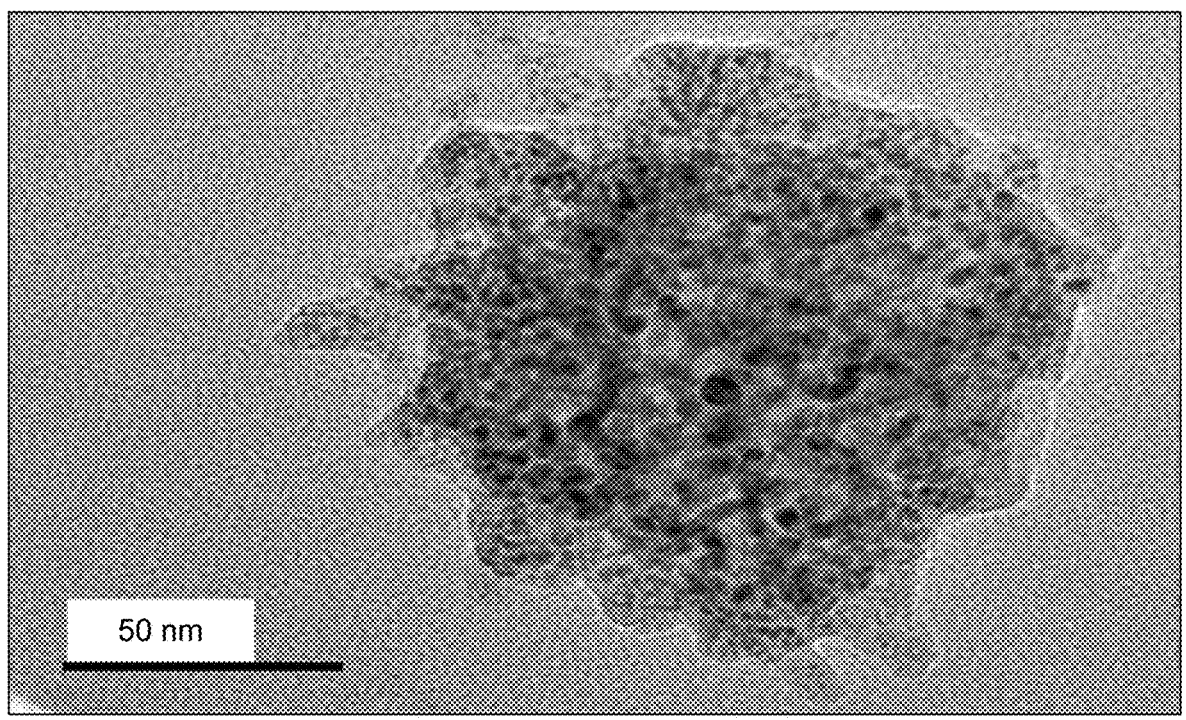
FIG. 5A and FIG. 5B shows HR-TEM and d-spacing images of CS:SrO of 0:1, FIG. 5C
Figure 5B:
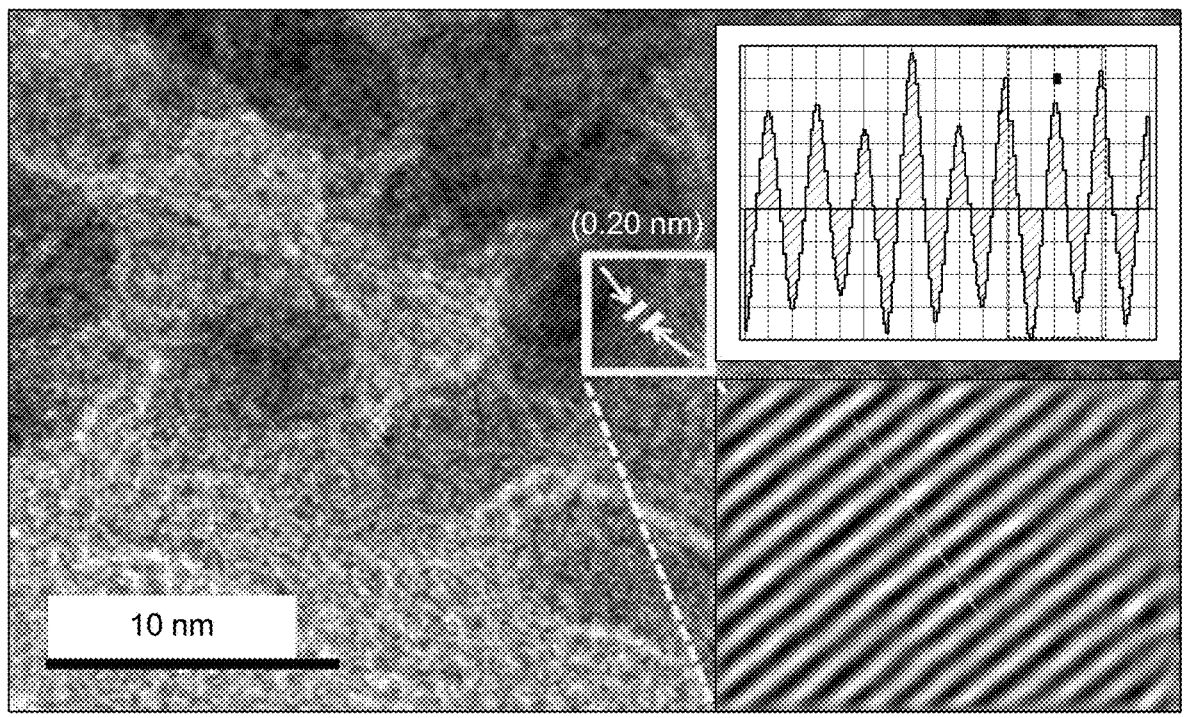
Figure 5C:
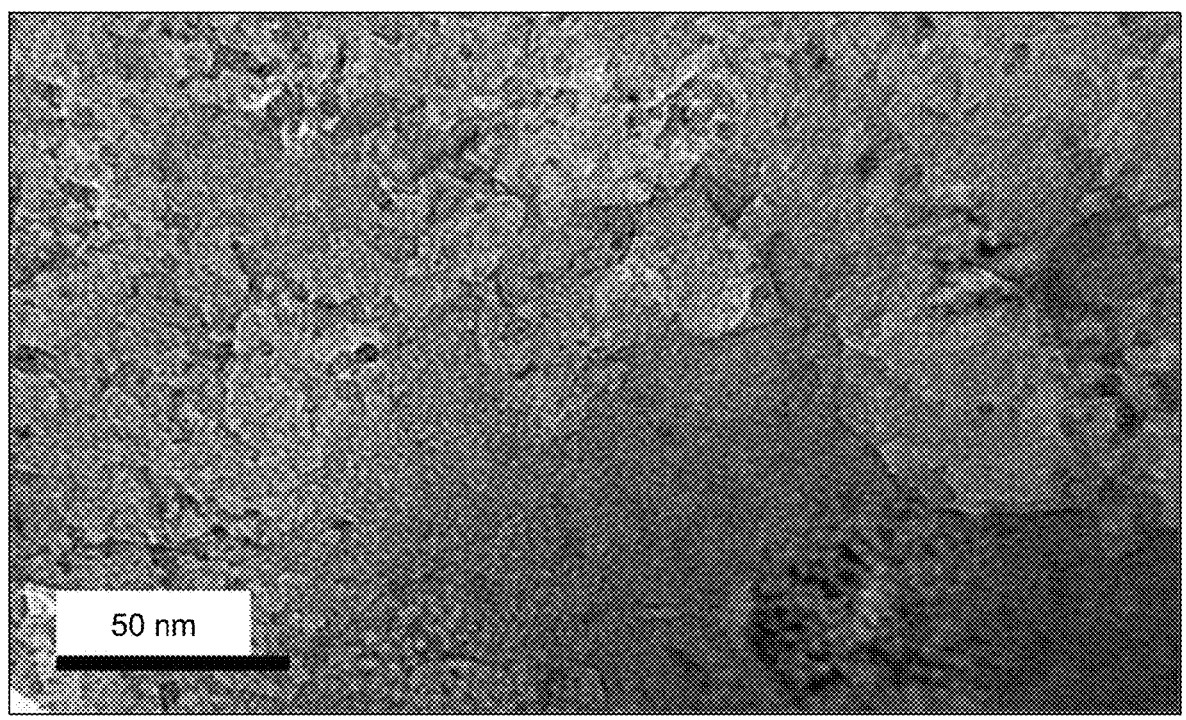
FIG. 5D shows spacing of 0.02:1, FIG. 5E
FIG. 5F shows of 0.04:1 and FIG. 5G
FIG. 5H shows of 0.06:1.
Figure 5D:
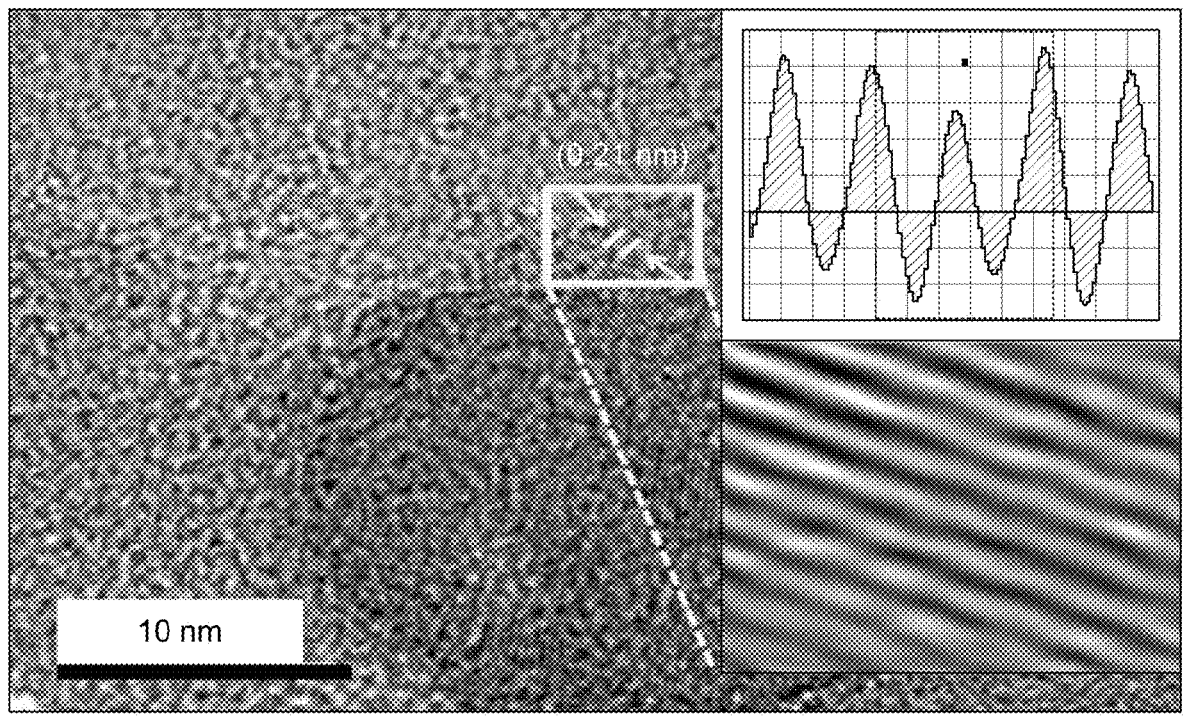
Figure 5E:
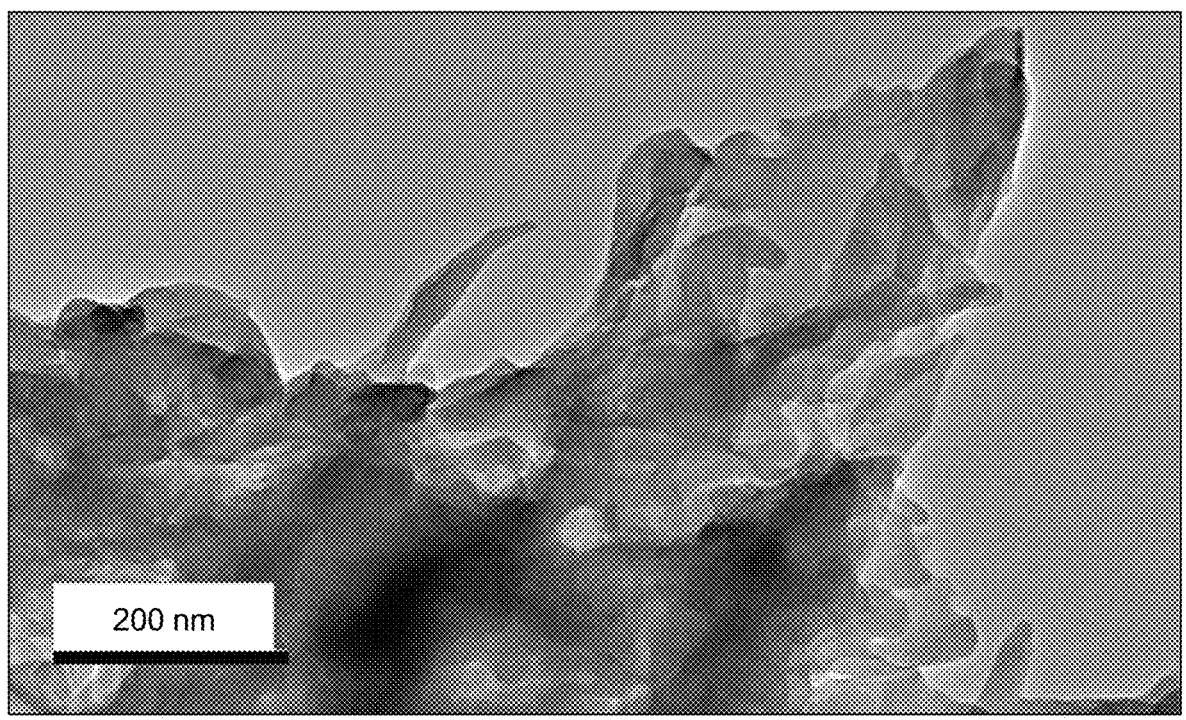
Figure 5F:
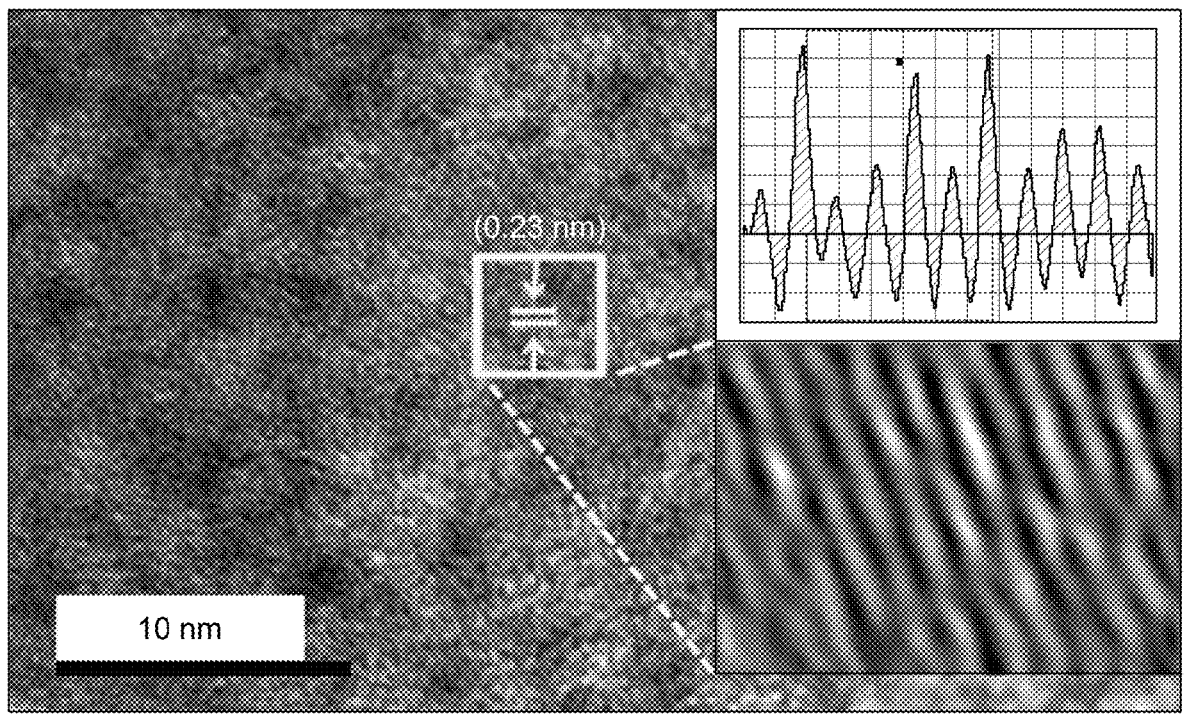
Figure 5G:
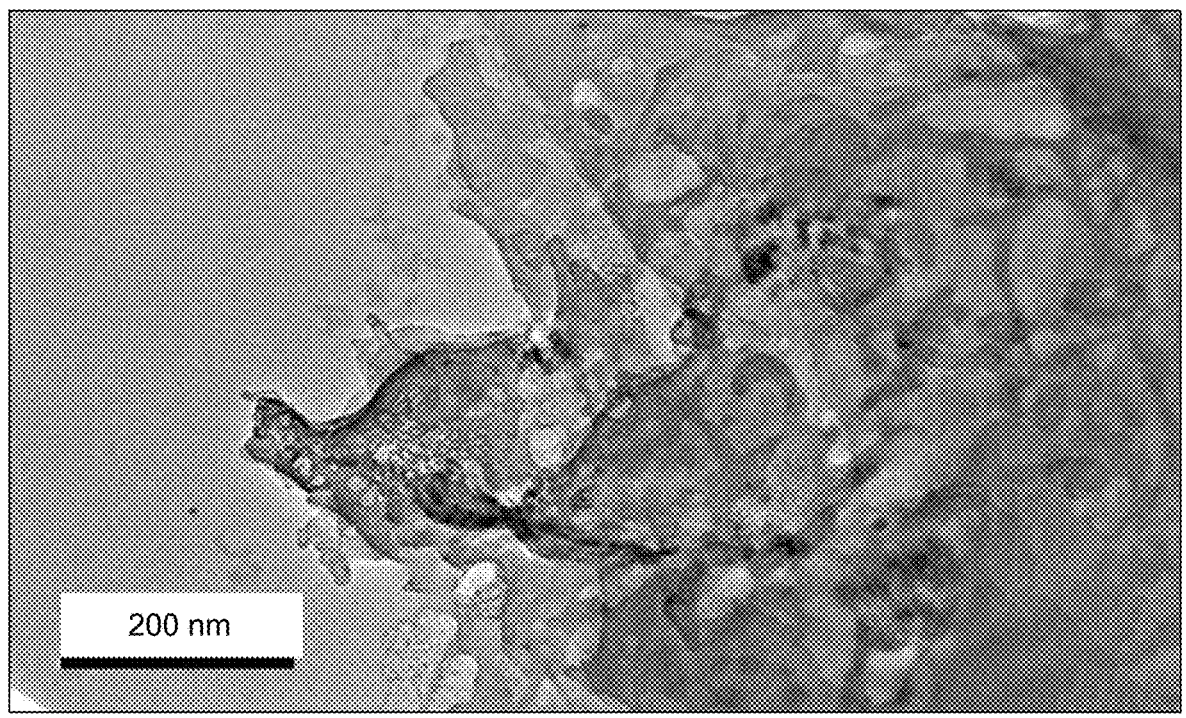
Figure 5H:
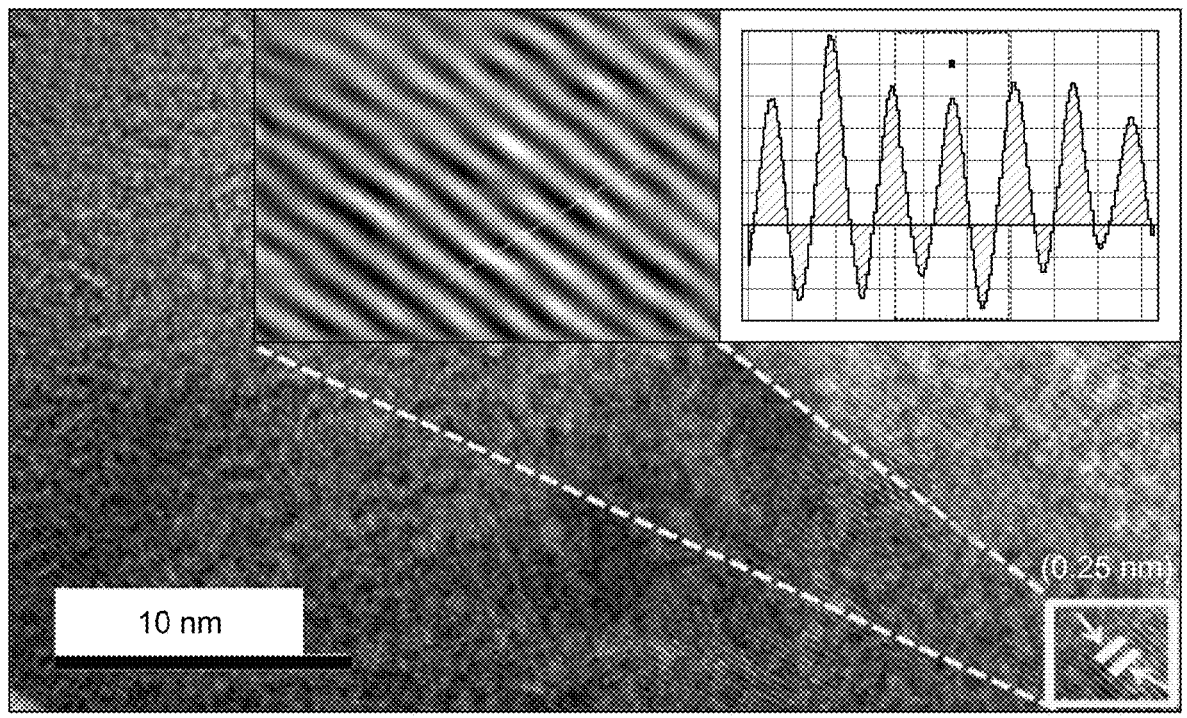

HR-TEM and d-spacing images of CS:SrO (FIG. 5A and FIG. 5B) of 0:1, (FIG. 5C and FIG. 5D) of 0.02:1, (FIG. 5E and FIG. 5F) of 0.04:1 and (FIG. 5G and FIG. 5H) of 0.06:1. HRTEM micrographs depicted the formation of dopant free SrO nanoparticle while porous sheet-like structure embedded with SrO nanoparticle was observed for CS-doped SrO nanocomposite. Agglomeration of SrO nanoparticle was revealed upon increasing doping concentration of CS as depicted in FIG. 4C and FIG. 4D. Confinement of SrO nanoparticle on CS propose a change in $E_g$ edge of material resulting in blueshift in absorption spectra as confirmed by UV-Vis spectra (FIG. 4A). FIGS. 5C, 5D, 5E and 5F images confirmed the formation of agglomerated nanorod-like morphology of doped structures. HRTEM micrographs were used to calculate interlayer d-spacing (FIGS. 5B and 5F) using Gatan software. This was found to be 0.20 nm for SrO and 0.21, 0.23 and 0.25 nm for CS:SrO (2, 4 and 6 wt %) respectively, which matched well with XRD results. Meanwhile, dopant effect on the change in d-spacing is also clear.

Figure 6A:
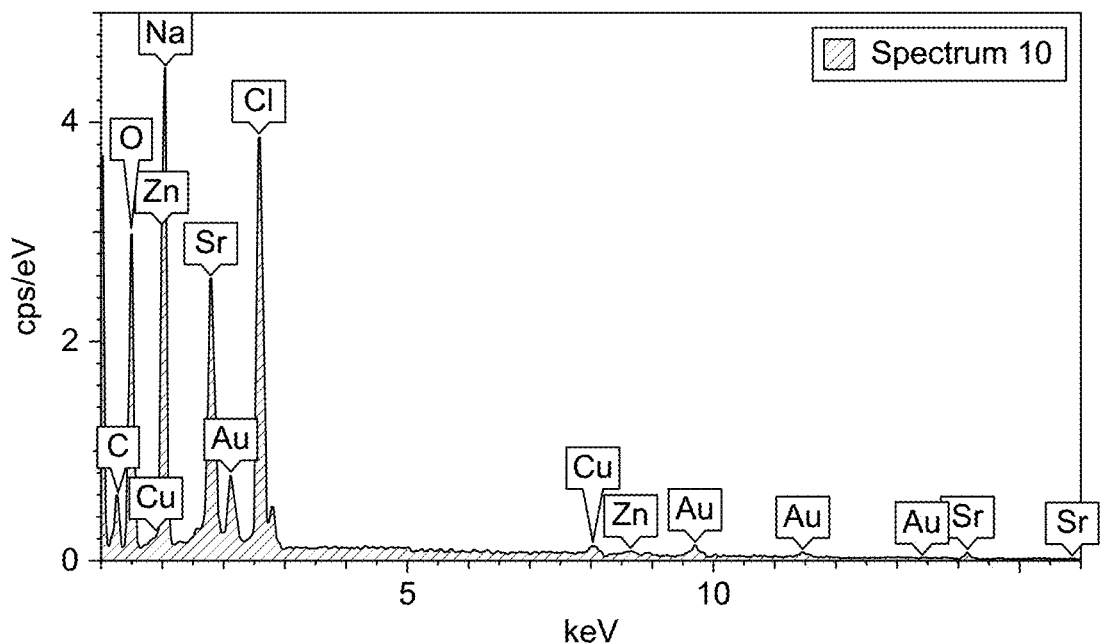
FIG. 6A, FIG. 6B, FIG. 6C and FIG. 6D shows analysis of CS-doped SrO nanocomposite with CS content (2, 4 and 6 wt %).
Figure 6B:
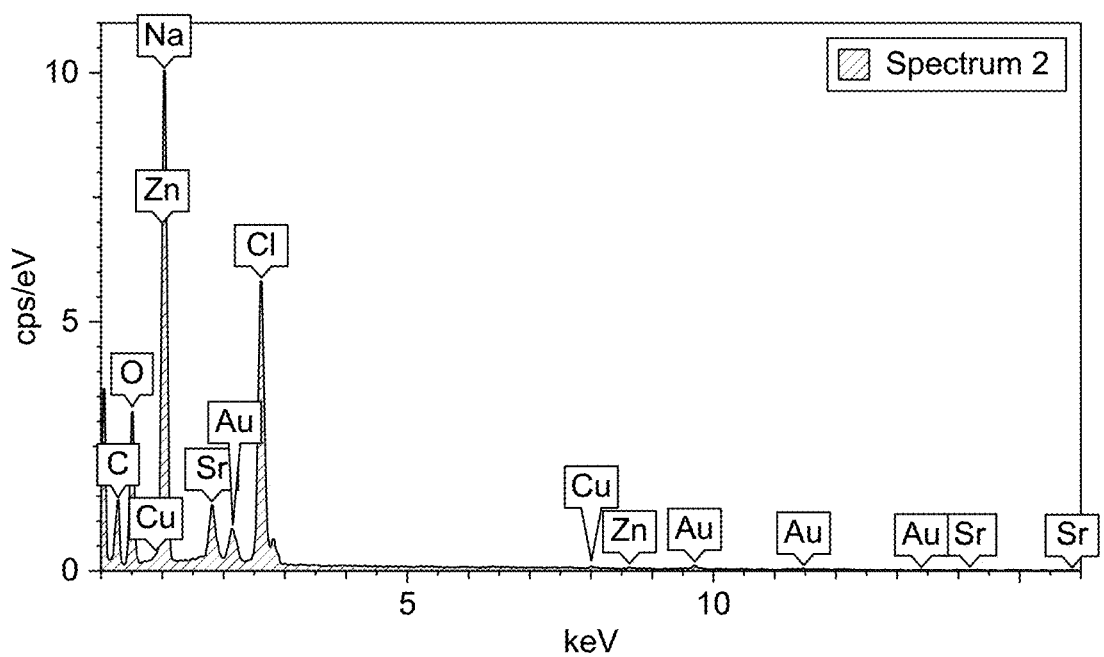
Figure 6C:
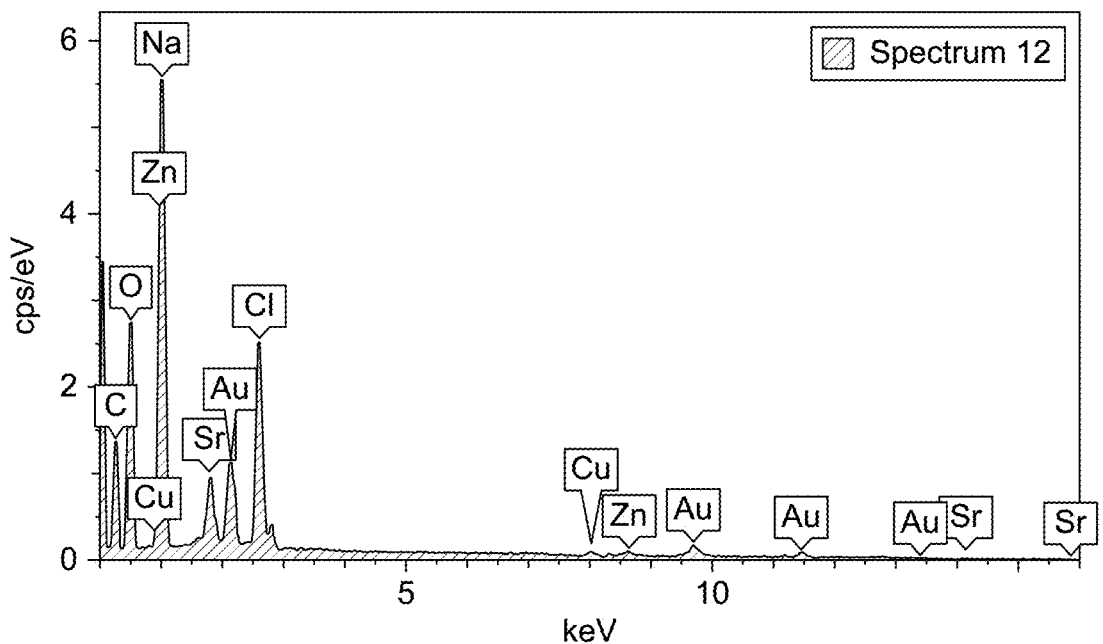
Figure 6D:
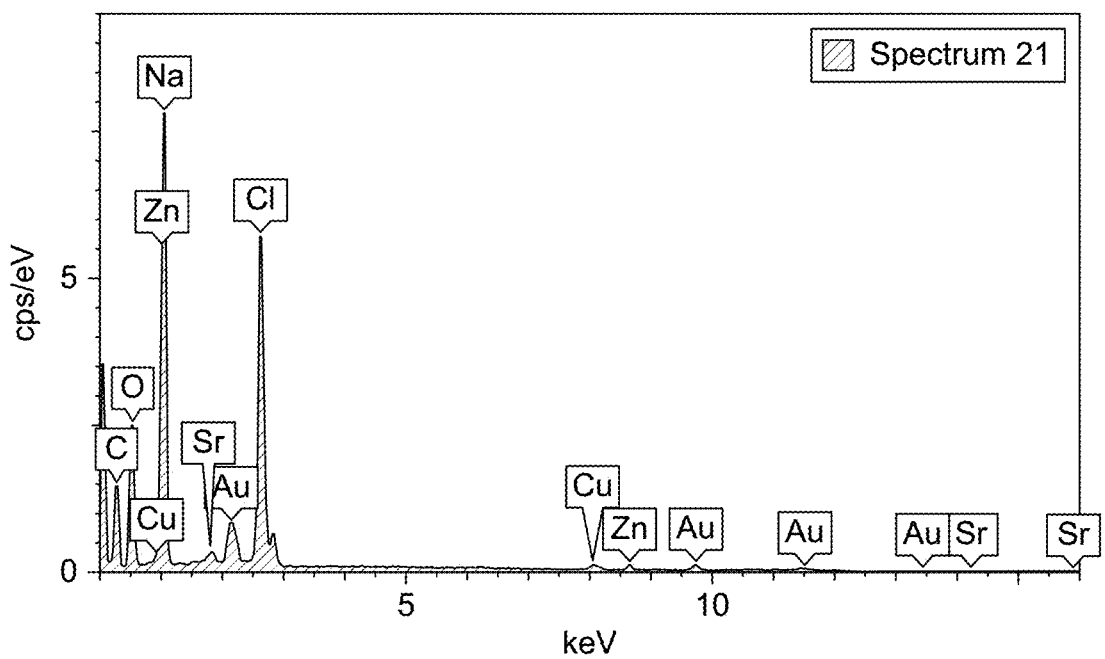

FIG. 6A, FIG. 6B, FIG. 6C and FIG. 6D shows analysis of CS—SrO nanoparticle with CS content ranging from 2, 4 and 6 wt %. Elemental composition of SrO nanoparticle and CS-doped SrO nanocomposite has been determined by EDS which confirmed the presence of metal and oxygen components in SrO nanoparticle. EDS analysis indicated 1:1 composition of Sr and O along with other impurities such as Na, and Zn. Peaks of gold (Au) originated from coating sputtered on the samples to prevent charging during SEM analysis. Carbon and oxygen signals in doped samples depicted successful incorporation of CS in SrO (FIGS. 6b-d).

Figure 7A:
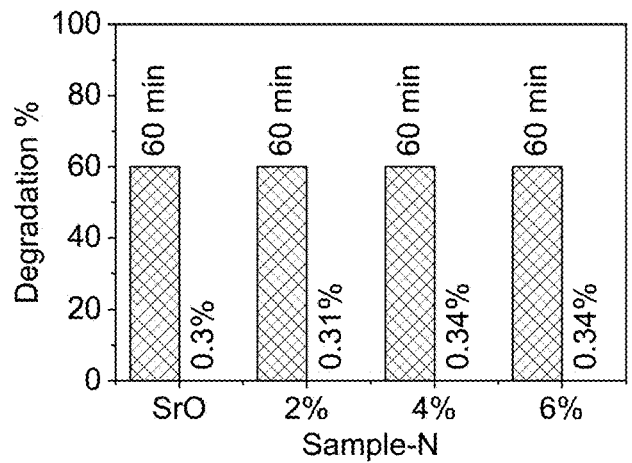
FIG. 7A shows Neutral catalysis.
Figure 7B:
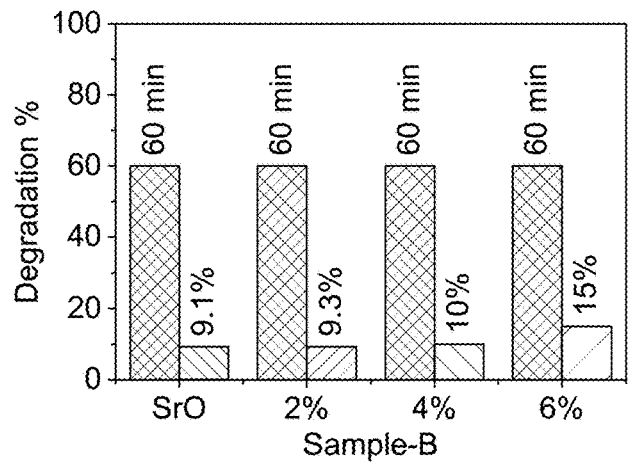
FIG. 7B shows basic catalysis and FIG. 7C shows acidic catalysis of SrO, CS-doped SrO nanocomposite (2, 4 and 6 wt %).
Figure 7C:
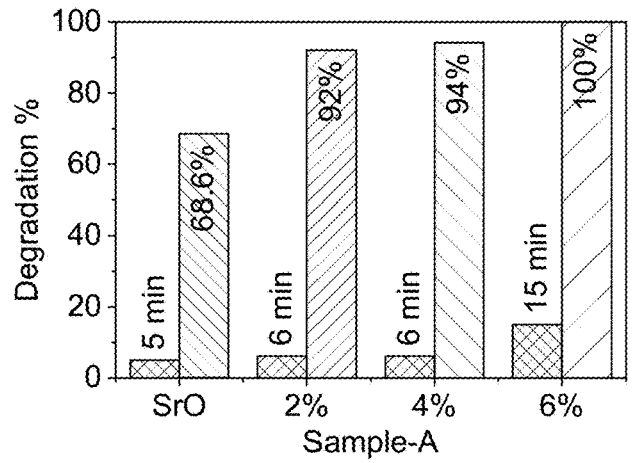

To degrade the organic dye (MBCF), catalytic activity of synthesized nanocomposites was performed in different medium (Neutral, Basic and Acidic). UV-Vis absorption spectra obtained for degradation of MBCF in the presence of reducing agent $NaBH_4$ was used to investigate catalytic activity of synthesized nanocomposites in acidic (FIG. 7A), neutral (FIG. 7B) and basic medium (FIG. 7C). The negligible reduction potential of $NaBH_4$ in the absence of nanocomposites was also examined. Catalytic activity of prepared samples was found to be highly dependent on pH of the medium. At neutral pH 7, 3mL of sample and 400 uL of $NaBH_4$ were added in 3mL of MBCF for 60 minutes. Samples showed negligible catalytic activity with reference sample depicting 0.3% degradation while doped samples showed 0.31, 0.34 and 0.34% degradation, respectively (FIG. 7A).

For basic medium, NaOH (0.5 M) was used to maintain pH=12 of dye while the afore-mentioned method was adopted to check degradation performance. Enhanced catalytic activity was observed compared to neutral medium with SrO nanoparticle showing degradation of 9.1% while CS-doped SrO nanocomposite (2, 4 and 6 wt %) degraded about 9.3, 10 and 15% of dye, respectively within 60 minutes (FIG. 7b). Catalytic activity of catalyst in basic medium is affected by strong basic sites induced on catalyst surface.

For acidic pH (~4), $H_2SO_4$ (0.5 M) was added which increased availability of $H^+$ ions to be adsorbed on the surface of SrO nanoparticle enhancing catalytic activity. SrO showed 86.6% degradation whereas CS-doped SrO nanocomposite (CS 2 and 4 wt %) decolorized 92 and 94% of dye within 6 min. Furthermore, 6% CS dopant carrying CS-doped SrO nanocomposite showed the maximum (100%) degradation in acidic medium (pH 4). Catalytic activity depends upon crystallinity, morphology and surface area of particles. In this study, increased agglomeration of SrO nanoparticle offering larger surface area might be the reason for increased catalytic action. Catalytic activity of synthesized (SrO, 2% Cs-doped SrO nanocomposite, 4% CS-doped SrO nanocomposite and 6% CS-doped SrO nanocomposite was performed). Samples-N (indicating neutral FIG. 7A), Sample-B (indicating basic Medium (7B) and Samples-A (indicating acidic medium FIG. 7C) respectively. We have performed catalytic activity of MBCF with our prepared all four samples as discussed above.

INDUSTRIAL APPLICABILITY

CS-doped SrO nanocomposite were successfully synthesized through co-precipitation route for catalytic activities. Effect of CS doping on SrO nanoparticle resulting in CS-doped SrO nanocomposite morphological features, optical properties, elemental composition and phase constitution was analysed. XRD analysis confirmed tetragonal and cubic structures of SrO nanoparticle and CS-doped SrO nanocomposite. UV-vis spectroscopy was used to obtain 4.19 eV of SrO nanoparticle while emission spectra of CS-doped SrO nanocomposite showed blueshift upon CS doping with multi-concentration. Interlayer d-spacing attained from HRTEM micrographs well matched with XRD d-spacing. Purity content of prepared nanocomposites was measured with EDS analysis. Extent of nanorods (NRs) formation increased upon doping which served to enhance the catalytic activity. Improved catalytic activity was observed in acidic medium with maximum degradation of 100% shown by 6 wt % CS-doped SrO nanocomposite.

What is claimed is:
1. A method, consisting of;
dissolving a strontium chloride hexahydrate in water and stirring the solution for 2 hours to make a dissolved solution of the strontium chloride hexahydrate;
adjusting a pH of the dissolved solution of strontium chloride hexahydrate to a specific pH by adding sodium hydroxide solution and stirring the pH adjusted sodium hydroxide solution for 2 hours to form a precipitate of a strontium chloride hexahydrate nanoparticle in solution;

centrifuging the a strontium chloride hexahydrate nanoparticle in solution to collect a pellet of the precipitate of the strontium chloride hexahydrate nanoparticle;

heating the pellet of the strontium chloride hexahydrate nanoparticle at 120° C. for 24 hours and grinding the heated pellet to obtain a powder of strontium chloride hexahydrate nanoparticle;

preparing a strontium chloride hexahydrate nanoparticle solution using the powder of strontium chloride hexahydrate nanoparticle in distilled water and adding a specific concentrations of a chitosan solution to create a chitosan (CS)-doped Strontium oxide (SrO) nanocomposite; and reducing a pollutant content in water by adding the CS-doped SrO nanocomposite in presence of a reducing agent at a second specific pH to purify water.

2. The method of claim 1, wherein the specific basic solution is sodium hydroxide at 0.5M strength.

3. The method of claim 1, wherein the pollutant is a methylene blue ciprofloxacin dye.

4. The method of claim 1, wherein the specific pH is 12.

5. The method of claim 1, wherein the centrifugation is done at 4000 rpm for 10 minutes.

6. The method of claim 1, wherein the reducing agent is a sodium borohydrate.

7. The method of claim 1, wherein the specific concentrations of chitosan is one of a 2%, 4%, and 6%.

8. The method of claim 1, wherein the second specific pH is one of an acidic pH 4, neutral pH 7 or basic pH 12.

9. A process of making a chitosan (CS)-doped Strontium oxide (SrO) nanocomposite nanocomposite, consisting of;

mixing water and a strontium chloride hexahydrate and stirring the mixer for 2 hours to make a solution of the strontium chloride hexahydrate;

forming a precipitate of a strontium chloride hexahydrate nanoparticle in solution by adjusting a pH of the solution of strontium chloride hexahydrate to a specific pH by adding sodium hydroxide solution for 2 hours and stifling;

collecting a pellet strontium chloride hexahydrate nanoparticle by centrifuging the a strontium chloride hexahydrate nanoparticle in solution;

making a powder of strontium chloride hexahydrate nanoparticle by heating the pellet of the strontium chloride hexahydrate nanoparticle at 120° C. for 24 hours;

preparing a strontium chloride hexahydrate nanoparticle solution using the powder of strontium chloride hexahydrate nanoparticle in distilled water and adding a specific concentrations of a chitosan solution to create a chitosan (CS)-doped Strontium oxide (SrO) nanocomposite; and purifying water by reducing a pollutant content in water by adding the CS-doped SrO nanocomposite in presence of a reducing agent at a second specific pH.

10. The process of claim 9, wherein the specific basic solution is sodium hydroxide at 0.5M strength.

11. The process of claim 9, wherein the pollutant is a methylene blue ciprofloxacin dye.

12. The process of claim 9, wherein the specific pH is 12.

13. The process of claim 9, wherein the centrifugation is done at 4000 rpm for 10 minutes.

14. The process of claim 9, wherein the reducing agent is a sodium borohydrate.

15. The process of claim 9, wherein the specific concentrations of chitosan is one of a 2%, 4%, and 6%.

16. The process of claim 9, wherein the second specific pH one of an acidic pH 4, neutral pH 7 or basic pH 12.

* * * * *